(12) United States Patent
Bardenstein

(10) Patent No.: US 10,291,637 B1
(45) Date of Patent: May 14, 2019

(54) NETWORK ANOMALY DETECTION AND PROFILING

(71) Applicant: Palantir Technologies Inc., Palo Alto, CA (US)

(72) Inventor: Daniel Bardenstein, San Francisco, CA (US)

(73) Assignee: PALANTIR TECHNOLOGIES INC., Palo Alto, CA (US)

(\*) Notice: Subject to any disclaimer, the term of this patent is extended or adjusted under 35 U.S.C. 154(b) by 230 days.

(21) Appl. No.: 15/201,856

(22) Filed: Jul. 5, 2016

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC .................. H04L 63/1416; H04L 63/1425
See application file for complete search history.

(56) References Cited

U.S. PATENT DOCUMENTS

| | | | |
|---|---|---|---|
| 5,978,475 | A | 11/1999 | Schneier et al. |
| 6,253,203 | B1 | 6/2001 | O'Flaherty et al. |
| 6,725,240 | B1 | 4/2004 | Asad et al. |
| 6,807,569 | B1 | 10/2004 | Bhimani et al. |
| 7,017,046 | B2 | 3/2006 | Doyle et al. |
| 7,069,586 | B1 | 6/2006 | Winneg et al. |
| 7,225,468 | B2 | 5/2007 | Waisman et al. |
| 7,596,285 | B2 | 9/2009 | Brown et al. |
| 7,770,032 | B2 | 8/2010 | Nesta et al. |
| 7,801,871 | B2 | 9/2010 | Gosnell |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Brandon S Hoffman
*Assistant Examiner* — Thong P Truong
(74) *Attorney, Agent, or Firm* — Knobbe Martens Olson & Bear LLP

(57) ABSTRACT

A security system detects and attributes anomalous activity in a network. The system logs user network activity, which can include ports used, IP addresses, commands typed, etc., and may detect anomalous activity by comparing users to find similar users, sorting similar users into cohorts, and comparing new user activity to logged behavior of the cohort. The comparison can include a divergence calculation. Origins of user activity can also be used to determine anomalous network activity. The hostname, username, IP address, and timestamp can be used to calculate aggregate scores and convoluted scores. The system extracts features from the logged anomalous network activity, and determines whether the activity is attributable to an actor profile by comparing the extracted features and attributes associated with the actor profile based upon previous activity attributed to the actor.

20 Claims, 8 Drawing Sheets

(56) References Cited

U.S. PATENT DOCUMENTS

| | | |
|---|---|---|
| 7,962,495 B2 | 6/2011 | Jain et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,239,668 B1 | 8/2012 | Chen et al. |
| 8,301,904 B1 | 10/2012 | Gryaznov |
| 8,312,546 B2 | 11/2012 | Alme |
| 8,646,080 B2 | 2/2014 | Williamson et al. |
| 8,683,322 B1 | 3/2014 | Cooper |
| 8,726,379 B1 | 5/2014 | Stiansen et al. |
| 8,769,412 B2 | 7/2014 | Gill et al. |
| 8,782,794 B2 | 7/2014 | Ramcharran |
| 8,931,043 B2 | 1/2015 | Cooper et al. |
| 9,021,260 B1 | 4/2015 | Falk et al. |
| 9,049,117 B1 | 6/2015 | Nucci et al. |
| 9,100,428 B1 | 8/2015 | Visbal |
| 9,335,897 B2 | 5/2016 | Goldenberg |
| 9,338,013 B2 | 5/2016 | Castellucci et al. |
| 9,654,485 B1* | 5/2017 | Neumann ........... H04L 63/1416 |
| 2002/0112157 A1 | 8/2002 | Doyle et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0157662 A1 | 7/2005 | Bingham et al. |
| 2005/0229256 A2 | 10/2005 | Banzhof |
| 2005/0262556 A1 | 11/2005 | Waisman et al. |
| 2005/0275638 A1 | 12/2005 | Kolmykov-Zotov et al. |
| 2006/0031928 A1 | 2/2006 | Conley et al. |
| 2006/0069912 A1 | 3/2006 | Zheng et al. |
| 2006/0179003 A1 | 8/2006 | Steele et al. |
| 2006/0212931 A1 | 9/2006 | Shull et al. |
| 2006/0218637 A1 | 9/2006 | Thomas et al. |
| 2006/0265747 A1 | 11/2006 | Judge |
| 2007/0143851 A1 | 6/2007 | Nicodemus |
| 2007/0294766 A1 | 12/2007 | Mir et al. |
| 2008/0104407 A1 | 5/2008 | Horne et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2009/0103442 A1 | 4/2009 | Douville |
| 2009/0228701 A1 | 9/2009 | Lin |
| 2009/0328222 A1 | 12/2009 | Helman et al. |
| 2010/0077481 A1 | 3/2010 | Polyakov et al. |
| 2010/0100963 A1 | 4/2010 | Mahaffey |
| 2010/0179831 A1 | 7/2010 | Brown et al. |
| 2010/0235915 A1 | 9/2010 | Memon et al. |
| 2010/0262688 A1 | 10/2010 | Hussain et al. |
| 2010/0330801 A1 | 12/2010 | Rouh |
| 2011/0060910 A1 | 3/2011 | Gormish et al. |
| 2011/0202555 A1 | 8/2011 | Cordover et al. |
| 2011/0219450 A1 | 9/2011 | McDougal et al. |
| 2012/0079592 A1 | 3/2012 | Pandrangi |
| 2012/0084866 A1 | 4/2012 | Stolfo |
| 2012/0110633 A1 | 5/2012 | An et al. |
| 2012/0110674 A1 | 5/2012 | Belani et al. |
| 2012/0169593 A1 | 7/2012 | Mak et al. |
| 2012/0218305 A1 | 8/2012 | Patterson et al. |
| 2012/0254129 A1 | 10/2012 | Wheeler et al. |
| 2012/0284791 A1 | 11/2012 | Miller et al. |
| 2012/0330801 A1 | 12/2012 | McDougal et al. |
| 2013/0019306 A1 | 1/2013 | Lagar-Cavilla et al. |
| 2013/0097709 A1 | 4/2013 | Basavapatna et al. |
| 2013/0110876 A1 | 5/2013 | Meijer et al. |
| 2013/0139268 A1 | 5/2013 | An et al. |
| 2013/0239217 A1 | 9/2013 | Kindler et al. |
| 2013/0312092 A1* | 11/2013 | Parker ................. H04L 63/1408 726/22 |
| 2014/0013451 A1 | 1/2014 | Kulka et al. |
| 2014/0059683 A1 | 2/2014 | Ashley |
| 2014/0123279 A1 | 5/2014 | Bishop et al. |
| 2014/0143009 A1 | 5/2014 | Brice et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0283107 A1 | 9/2014 | Walton et al. |
| 2014/0366132 A1 | 12/2014 | Stiansen et al. |
| 2015/0013006 A1* | 1/2015 | Shulman ............. H04L 63/1416 726/23 |
| 2015/0039565 A1 | 2/2015 | Lucas |
| 2015/0128274 A1 | 5/2015 | Giokas |
| 2015/0188715 A1 | 7/2015 | Castelluci et al. |
| 2015/0229664 A1 | 8/2015 | Hawthorn et al. |
| 2015/0248563 A1 | 9/2015 | Alfarano et al. |
| 2015/0261847 A1 | 9/2015 | Ducott et al. |
| 2015/0326601 A1 | 11/2015 | Grondin et al. |
| 2016/0004864 A1 | 1/2016 | Falk et al. |
| 2016/0028759 A1 | 1/2016 | Visbal |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

* cited by examiner

NETWORK ANOMALY DETECTION AND PROFILING

TECHNICAL FIELD

The present disclosure relates to systems, methods, and techniques for computer and network security, and more specifically to improving the security of computer systems and networks, and even more specifically to detecting anomalous behavior indicative of hacking.

BACKGROUND

Computer systems and networks can employ various measures to prevent activity by unauthorized users. For example, a network can require a username and password to authenticate a user before allowing access. However, there remains a need for a security system to better detect anomalous activity, for example, when an authenticated user is actually a malicious actor. In addition, anomalous network activity generally lacks real-world identifiers. As such, it can often be difficult to attribute anomalous activity on a network to a particular malicious actor or group.

SUMMARY

The systems, methods, and devices described herein each have several aspects, no single one of which is solely responsible for its desirable attributes. Without limiting the scope of this disclosure, several non-limiting features will now be discussed briefly.

A computer system for profiling and anomaly detection is disclosed herein to identify when a user of a network is a malicious actor, and whether the user matches any known malicious actors or groups. The system can include one or more computer readable storage devices configured to store one or more software modules including computer executable instructions, and one or more hardware computer processors in communication with the one or more computer readable storage devices. The instructions are executed on the one or more software modules to cause the computer system to receive one or more logs indicating activity on a network by a first actor, and determine whether the logged network activity is anomalous. The executed instructions may further cause the computer system to, in response to a determination that the logged network activity is anomalous, identify one or more features of the logged network activity, access a data store containing one or more profiles, each profile corresponding to an actor to which anomalous network activity has been attributed, and determine whether the logged network activity is attributable to a profile of one or more profiles, based at least in part upon the identified features.

In some embodiments, a computer-implemented method for anomaly detection and profiling is provided. The method may comprise receiving one or more logs indicating activity on a network by a first actor. The method may further comprise determining whether the logged network activity is anomalous. The method may further comprise, in response to a determination that the logged network activity is anomalous, identifying one or more features of the logged network activity, accessing a data store containing one or more profiles, each profile corresponding to an actor to which anomalous network activity has been attributed, and determining whether the logged network activity is attributable to a profile of one or more profiles, based at least in part upon the identified features.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

Figure 1:
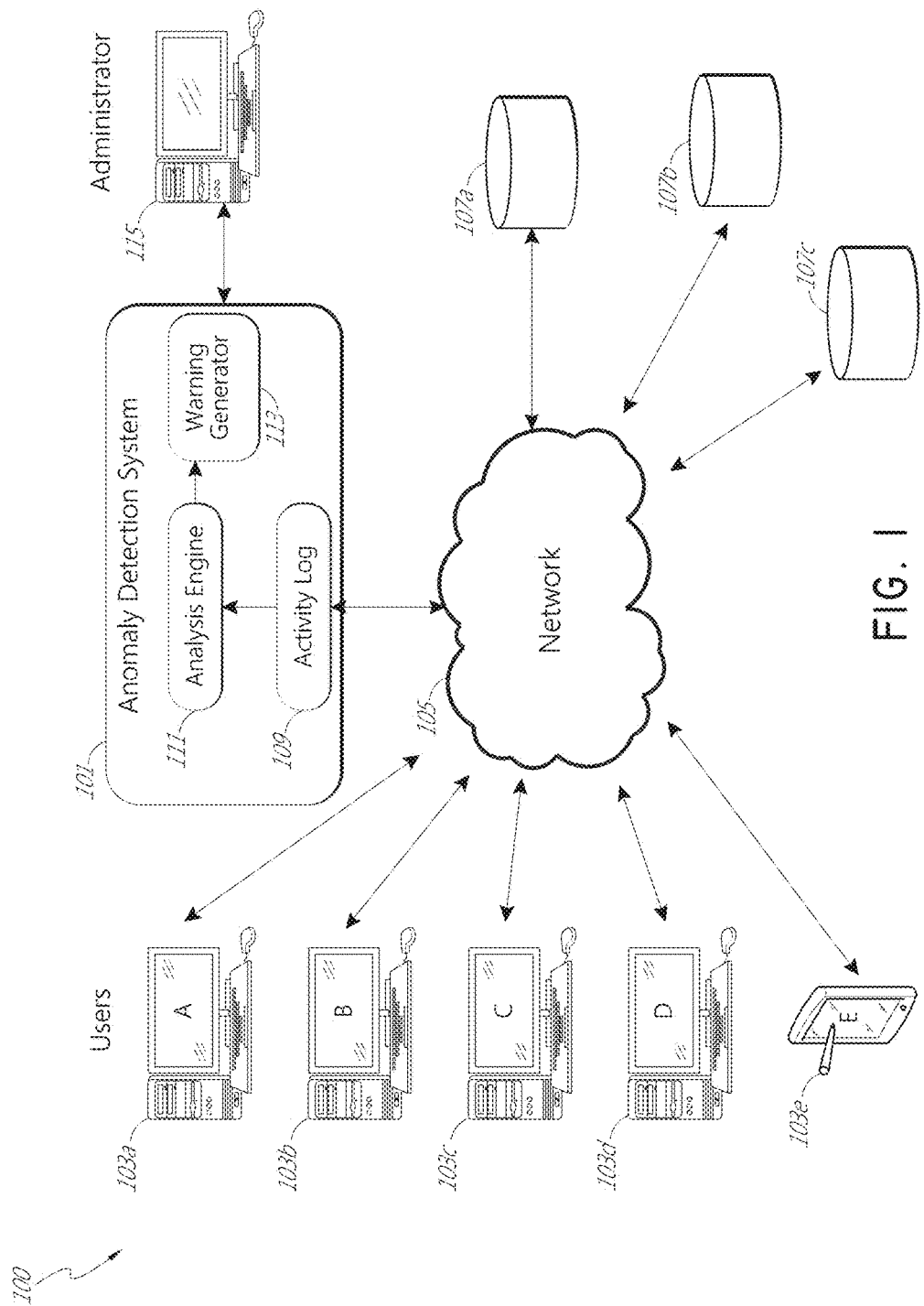
FIG. 1 shows an example of a computer network using an anomaly detection system according to one embodiment.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

"Anomalous activity" includes, without limitation, actions performed on a network that are not characteristic of typical actions performed by an authorized user. Anomalous activity may indicate that a different individual has gained access to the network.

"Authorized user" includes, without limitation, users of a network that have been authenticated by the network (e.g., using a password or other type of security token).

"Port" includes, without limitation, a software-created communication number in a computer that can be used to by different software to share a physical communication connection.

"Network resources" include, without limitation, resources available through a network. Examples of resources include, without limitation, an email, a database, a file, a program, a server, a computer, a directory, a file path or directory, a permission, a program, a program license, memory, processors, a machine, time to utilize a machine, etc.

"Distributed resources" include, without limitation, resources accessible from different points on a network, such as from two separate servers. A resource can be distributed, for example, by being mirrored or striped across different machines, or if a plurality of the resource exists across different network points, such as a software license available on a first server and the same software license available on a different server.

"Network activity" includes, without limitation, all actions performed on a network, such as commands, receptions, traffic, etc. Logging network activity can include, for example, any aspect or combinations of aspects of the network activity, for example, sources, destinations, traffic size, traffic speed, traffic type, data, user ID, user IP address, bandwidth, a total amount of data transmitted by users, a total amount of data received by users, a port used by a user to access the network, a port used by network resources to communicate with the user, an IP address of network resources accessed by the user, times of activity, an origin from which the user accesses the network, a permission level necessary to perform user requests, etc.

"Score" includes, without limitation, numeric rankings, ratings, or grades and can be represented as a number in a range (e.g., 0.0 to 1.0, 0 to 100, −100 to 100), letter (e.g., A+, B, F), label (e.g., safe, neutral, danger), etc. A score can be determined by an algorithm or formula.

"Actor" or "Malicious Actor" may refer to an individual (such as a hacker), group, and/or organization responsible for performing anomalous activity on a network.

Overview

Various embodiments of the present disclosure provide improvements to various technologies and technological fields. For example, various aspects of the embodiments can improve anomaly detection in a network, and the profiling and attribution of detected anomalous activity. The security system can receive logged network activity in order to detect anomalous activity based upon various extracted network activity features. In addition, the security system may future use extracted features of detected anomalous activity to attribute the activity to an actor profile (e.g., corresponding to an individual or group), which can then be used to track and analyze trends in anomalous activities performed by various individual actors or groups.

Not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various embodiments of the present disclosure discuss recently arisen technological problems and solutions inextricably tied to those technologies. For example, some parts of the specification disclose technology that reduces the number of false positive warnings generated by security systems as a result of distributed resources in a network, a recently arisen technological problem.

Parts of the specification disclose how to implement specific technological solutions that are otherwise difficult to implement on a computer. Some parts of the specification discuss computer-implementable solutions to non-mathematical problems such as determining "Is this activity suspicious?" or "Who performed this activity?"

Parts of the specification disclose improvements to existing technological solutions. For example, some embodiments feature improved anomaly detection accuracy and anomaly attribution accuracy over previous solutions. Parts of the specification disclose the use of computer systems to solve problems that cannot be inherently solved by humans alone. For example, computers can perform some functions very quickly to provide security measures that can prevent hacking and data theft. Computers can receive inputs and detect anomalies as fast as or nearly as fast as they occur, and computers can then perform security measures (e.g., disable network access or generate warnings) before the network is compromised. Computer network systems can process data at speeds far faster than humans. By the time humans finish certain computations by hand and discover an anomaly, hackers could have long ago compromised the network, and it would be too late to take any preventative security measures. As a result, a human performing some calculations instead of computers would render useless the anomaly detection system for a computer network. Accordingly, some parts of disclosed methods are performed in real-time or fast enough to prevent further hacking.

FIG. 1 shows an example of a computer network 100 using an anomaly detection system according to one embodiment. A plurality of users 103[a-e] can access a network 105. Resources 107a, 107b, and 107c can be connected to and accessible through the network.

The users 103[a-e] can access the network 105 through a variety of different terminals. For example, user 103a can access the network 105 through a desktop computer. User 103e can access the network 105 through a handheld portable device. In some embodiments, users can access the network through desktops, laptops, tablets, smartphones, or other suitable devices.

The users 103[a-e] can access the network to perform similar or different tasks. In order to connect to the network 105, the users can be required to identify themselves, for example, with a username or other identification such has MAC address, IP address, key card, etc. To prevent unauthorized access to the network, the users 103[a-e] can need to authenticate their identity by a password or other type of security token.

The network 105 can be any type of network. For example, it can be a virtual private network (VPN), the internet, an intranet, an internal network, corporate network, local area network (LAN), wireless network, etc.

The resources 107a, 107b, and 107c accessible to a user through the network can include, for example: an email, a database, a file, a program, a server, a computer, a directory, a file path or directory, a permission, a program, a program license, memory, processors, a machine, time to utilize a machine, etc. The resources can be distributed, and the physical machines through which the resources are accessible can be located in different places.

While a username and password provide basic network security to prevent unauthorized access by some individuals, there remains a need for a security system to detect network intrusions after this front line of defense has been breached. For example, a username and password might be stolen by a hacker through phishing, social engineering, keyloggers, etc. In another example, a username and password can be guessed, discovered through a brute-force attack, or reset by an impersonator. As yet another example, a virus, Trojan, or other computer exploit can allow a hacker to infect a user's machine, enabling the hacker to gain access to the network once the user logs into the network from the infected machine. After gaining access, a hacker might attempt to steal sensitive information. This can include, for example, credit card information, personal user information, sales data, business strategies, engineering data, health information, customer lists, pricing records, etc.

In some embodiments, as an additional security measure, a network can use an anomaly detection system 101 to detect when an authorized user begins to perform suspicious or anomalous activities that might indicate an unauthorized network access. This anomaly detection system can supplement the username and password security system. However, to detect when anomalous activity occurs, the anomaly detection needs to be able to differentiate between normal and anomalous behaviors. The anomaly detection system 101 logs user activity in an activity log 109. The anomaly detection system can obtain this information on its own, e.g., by itself analyzing network packets, or it can receive this information from other sources in the network, e.g. from network routers or servers. The anomaly detection system, including the activity log, can be centralized or distributed across the network. The activity log can log a variety of user activity, such as user ID, user IP address, the type of network activity being performed by users, a bandwidth used by users, a total amount of data transmitted by users, a total amount of data received by users, a port used by a user to access the network, a port used by network resources to communicate with the user, an IP address of network resources accessed by the user, times of activity, an origin from which the user accesses the network, a permission level necessary to perform user requests, etc.

The analysis engine 111 can analyze the activity log and compare it to user activity to determine if the user activity is anomalous, even if the user has presented the proper authenticating username and password or other credentials. If the analysis engine 111 detects anomalous user activity, the warning generator 113 can generate a warning to a system administrator 115. In some embodiments, the warning generator can take other measures to secure the network, such as revoking access from an individual suspected of anomalous activity, taking resources offline, etc. The warning generator can warn an administrator in different ways, for example, through a daily activity report, through a text message, through an email, or through an immediate alert. The warning generator can communicate through the network to send the warning to the administrator (e.g., send an internal company email through the network), communicate through an external network (e.g., send a text message through a cell phone carrier), or it can directly generate a warning on an administrator computer.

Even though FIG. 1 illustrates anomaly detection system 101 as being associated with one network 105, in some embodiments, an anomaly detection system 101 may be connected to multiple networks. For example, the anomaly detection system 101 may receive logged network activity data from a plurality of different monitored networks to be stored in activity log 109. In some embodiments, the larger amount of available data from multiple networks may allow for better detection of anomalous activity and more accurate attribution of the activity to various actors and groups.

Anomalous Activity Attribution

In some cases, it is desirable not only to be able to detect anomalous activity on a network, but also to be able to attribute the anomalous activity to a particular actor (e.g. an individual, group, or organization). By profiling the anomalous activity, administrators or law enforcement personnel may be able to identify what actors are performing the anomalous activity, what groups or organizations they are working for, what their goals are, and/or the like. This may allow them to better identify trends in the behavior of various actors, and to take steps to predict and prevent future anomalous activity.

For example, in some embodiments, when anomalous activity is detected on a particular network, instead of preventing the anomalous activity immediately, the anomalous activity may be monitored to collect sufficient data to allow the anomalous activity to be attributed to a particular actor profile. In some embodiments, previously collected network activity information may be analyzed to identify anomalous activity that may have occurred and to profile and attribute the identified anomalous activity to particular actors. Network activity information can be collected from multiple different networks, in order to more accurately attribute anomalous activity and track the activity of malicious actors across different networks.

Figure 2:
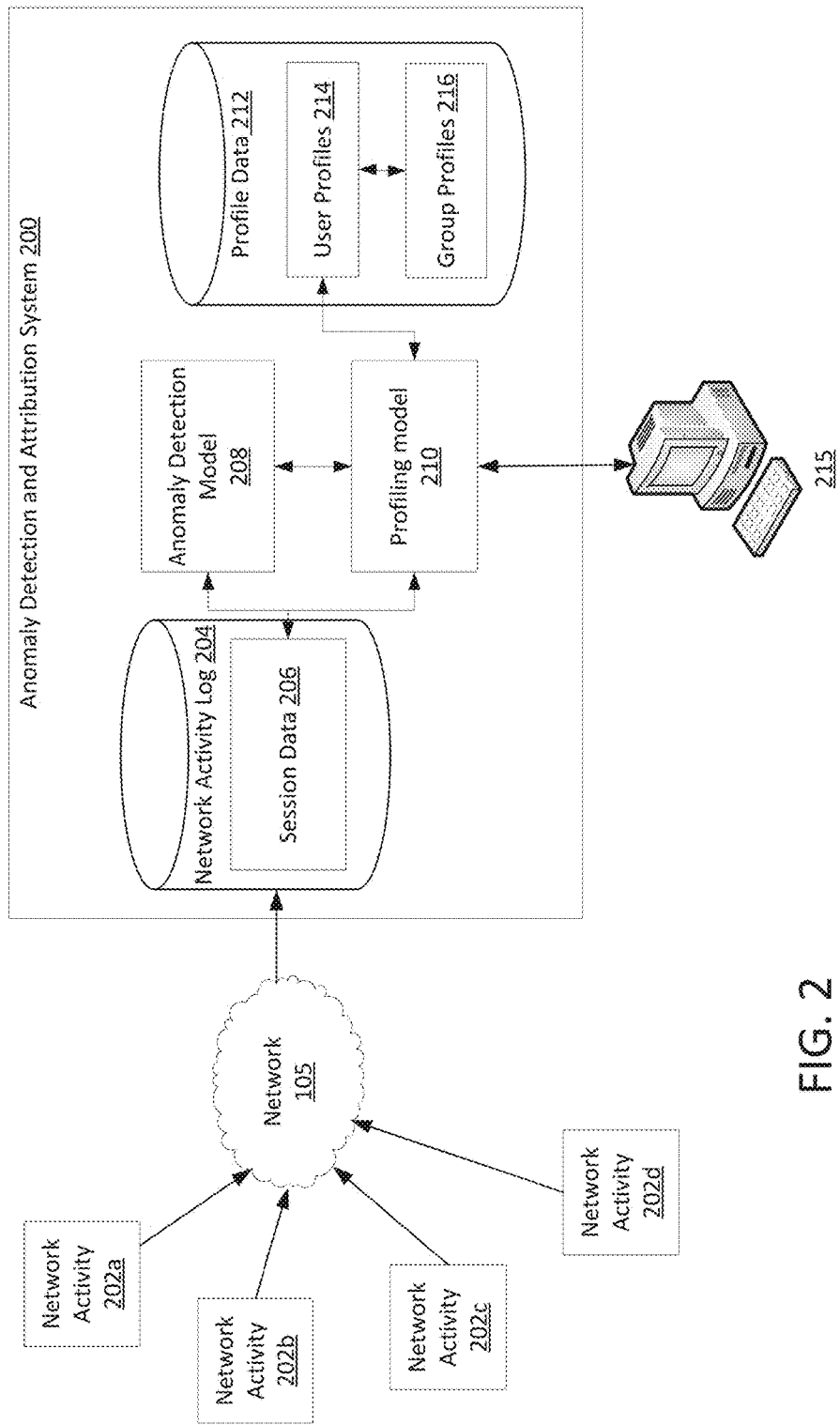
FIG. 2 illustrates a block diagram of an anomaly detection and attribution system that may be used to identify and profile anomalous activity, in accordance with some embodiments.

FIG. 2 illustrates a block diagram of an anomaly detection and attribution system 200 that may be used to identify and profile anomalous activity, in accordance with some embodiments. The analysis engine may receive network activity data 202[a-d] from one or more different networks (e.g., through network 105). For example, multiple networks may each be monitored, and the collected network activity data from each network received by the analysis engine.

The received network activity data may correspond to any type of actions performed on the network, and may include commands, receptions, traffic, source IP addresses, destination IP addresses, source and destination ports, MAC addresses, user agent strings, target URLs, network traffic, and/or the like. In some embodiments, the network activity data may also comprise commands typed, software applications used or accessed, files accessed or created, other URLs accessed by the user when accessing the network, and/or the like. In some embodiments, the network activity data may further comprise additional data such as geographic location (e.g., geographic location associated with a source IP address of a user accessing the network), time of activity, and/or the like.

The network activity data may be received and stored in a network activity log 204. In some embodiments, the network activity data stored in the network activity log may be organized into one or more sessions 206. A session may correspond to the network activity associated with a particular user accessing the network. In other embodiments, a session may include all network activity data associated with a particular network during a particular time period (e.g., a day, an hour, and/or the like). In some embodiments, a session 206 may correspond to a section of network activity data where anomalous activity has been identified.

The collected network activity data from the network activity log is analyzed by an anomaly detection model 208 in order to detect and identify anomalous activity. In some embodiments, the identified anomalous activity may be returned and stored as session data 206.

In some embodiments, the anomaly detection model 208 extracts one or more features from the session data. The features may comprise any type of network activity data contained within the session data, such as those described above. In some embodiments, a feature may comprise an aggregation of one or more pieces of network activity data (e.g., a particular combination of commands input by a user when the network is accessed, a particular URL accessed during a particular time, and/or the like). In some embodiments, the identified features may correspond to features that may be indicative of hacking or other anomalous activity. The model may weigh the extracted features and make a determination as to whether the session contains anomalous activity. In some embodiments, the model generates a score indicative of a probability that anomalous activity occurred during the session. If the generated score exceeds a threshold, a warning may be generated (e.g., displayed to an administrator).

In some embodiments, the anomaly detection model 208 may determine a type of anomalous activity being performed. For example, in many cases when a malicious actor hacks into a network, they may perform several different phases of activity at different times or across different sessions (e.g., an infiltration phase where they access the network, a data aggregation phase where they gather data from various resources in the network, or an exfiltration phase where the gathered data is retrieved from the network). Different phases of anomalous activity are discussed in greater detail below.

Various methods of identifying anomalous activity can be used. For example, in some embodiments, authorized users of a network may be divided into cohorts, and wherein network activity performed by a user may be compared to activities expected to be performed by members of their cohort, in order to determine if a malicious actor is using the user's authorization credentials to perform anomalous activity. Example systems and methods of identifying anomalous activity that can be use are described in U.S. patent application Ser. No. 14/970,317 titled "Network Anomaly Detection", filed Dec. 15, 2015, and in U.S. patent application Ser. No. 14/982,699 titled "Anomalous Network Monitoring, User Behavior Detection and Database System", filed Dec. 29, 2015, both of which are hereby incorporated by reference in their entireties.

In some embodiments, in addition to identifying anomalous activity, it can be desirable to be able to attribute the identified anomalous activity to particular actors (e.g., individual hackers, hacker groups, and/or the like). As such, the collected session data 206 may be run through a profiling model 210, in order to associate detected anomalous activity with one or more actor profiles (corresponding to individual hackers, groups of hackers, and/or the like). In some embodiments, the profiling model 210 may extract one or more features from the session data associated with the anomalous activity. These features may include source/destination IP addresses, source/destination ports, MAC addresses, user agent strings, URLs accessed, time of activity, commands used, filenames created, and/or the like. In some embodiments, the features extracted may be similar to those identified by anomaly detection model 208.

The extracted features may be used to identify an actor profile 214 (e.g., corresponding to an individual, group of individuals, organization, and/or the like) associated with the anomalous activity. For example, certain actors may typically use certain types of tools or exploits that may be different from those used by other hackers (e.g., certain tools or malware may be developed in certain countries, and thus more likely to be used by actors from that country, and not by actors from different countries). A particular actor may be known to operate in a particular country or geographic region, or be more likely to be active during certain times of the day.

In some cases, a particular actor may exhibit certain preferences when naming files or typing commands. For examples, actors associated with a particular group (e.g., a hacker cell) may have standard operating procedures that they use (e.g., file naming conventions, types of commands used, and/or the like).

Much as a piece of text may be semantically analyzed in order to form a "semantic fingerprint" and determine an author that the text can be attributed to, extracted features of the network activity logs can be analyzed to determine a "fingerprint" allowing the activity to be attributed to a particular actor. For example, the extracted features associated with the anomalous activity may be compared with attributes of the actor profile 214 (e.g., IP addresses associated with the profile, geographic region associated with the profile, preferred tools and behavior preferences exhibited by the actor, and/or the like) to determine how likely the anomalous activity can be attributed to the actor associated with the actor profile 214.

Actor profiles 214 for identified actors may be stored in a profile store 212. Each actor profile 214 may be associated with a history of previous anomalous activities that have been attributed to the actor, from which a plurality of attributes associated with the actor may be derived. These attributes may include, for example, IP addresses associated with the actor, a geographic location associated with the actor, typical times of day during which the actor is active, tools used by the actor, various patterns of behavior by the actor (e.g., how they tend to type commands, name files, and/or the like), networks targeted by the actor, and/or the like.

While the actual identity of the actor associated with an actor profile may remain unknown, the actor profile may be used to construct a history of hacks or other anomalous activity performed by the actor in the past, and attribute new hacks or other types of anomalous activity to the hacker or hacker group. In addition, in the event that an actor is later identified, the profile may be used to construct a history for past anomalous activities that they have been involved in.

In some embodiments, the profiling model 210 generates one or more scores indicating a probability that the identified anomalous activity is associated with particular existing actor profiles. The scores may be presented to an administrator or other user 215, who may choose to attribute the activity to a particular actor profile 214 based upon the generated scores, or create a new actor profile if it is deemed that the anomalous activity should not be attributed to an existing profile. In some embodiments, attribution of the anomalous activity (to an existing profile or a newly created profile) may be performed automatically (e.g., attribute the activity to a particular existing profile if the generated score associated with the profile exceeds a threshold value, create a new actor profile if none of the generated scores meet a threshold value, and/or the like). In some embodiments, the user 215 may also be able to perform additional functions, such as specifying new features that may be used to identify a profile (e.g., to be used by the profiling model 210). In some embodiments, the user may provide external or supplemental data to enhance the data of the profile store 212 (e.g., specify one or more attributes associated with an actor profile, attributing an actor profile to a known individual, and/or the like).

In some embodiments, one or more actor profiles 214 may be associated with a group profile 216. For example, actor profiles corresponding to individual hackers may be associated with a group profile corresponding to a hacking cell. Actor profiles corresponding to groups may be associated with a group profile associated with one or more attributes, such as country of origin. In some embodiments, associating actor profiles with groups may be performed using the profiling model. In some embodiments, a user 215 may specify a connection between an individual actor profile 214 with a group profile 216.

In some embodiments, the anomaly detection and attribution system 200 may be used to perform real-time monitoring. For example, the anomaly detection model 208 may process network activity data as it is received to identify anomalous activity to form session data 206 to be processed by the profiling model 210. One or more alerts may be generated (e.g., to user 215) in response to certain types of anomalous activity being detected, anomalous activity attributable to certain types of profiles (e.g., activity having a profiling score above a threshold amount associated with a profile having certain attributes), and/or the like.

Machine Learning

Figure 3:
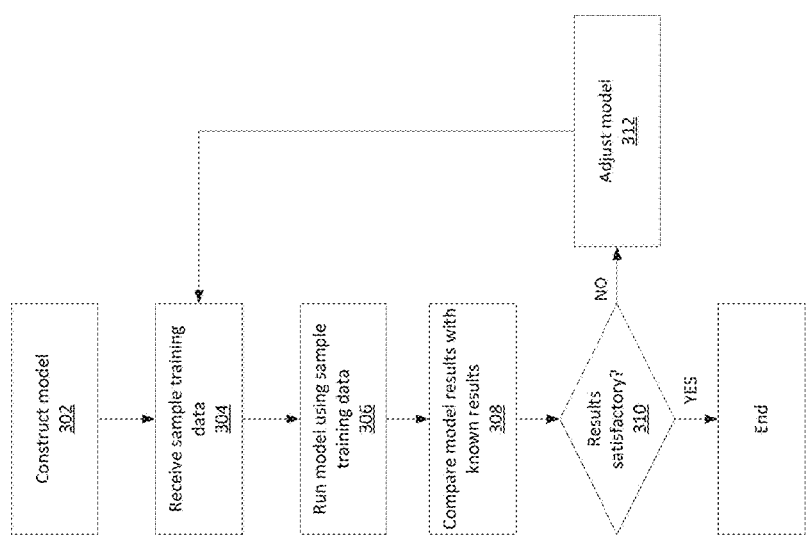
FIG. 3 illustrates a flowchart of a process for training a profiling model using machine learning, in accordance with some embodiments.

In some embodiments, the anomaly detection model 208 and profiling model 210 utilize machine learning to determine what types of features to identify and how the features should be weighed in order to identify anomalous activity and to profile the anomalous activity. In some embodiments, the models must first be trained before they can be used to identify anomalous activity or profile identified anomalous activity. FIG. 3 illustrates a flowchart of a process for training a profiling model using machine learning, in accordance with some embodiments. At block 302, an initial profiling model is constructed. The initial model may indicate a plurality of features that can be extracted from received network activity data, and a set of initial weight values or algorithms used to determine how anomalous activity may be attributed based upon the extracted features.

At block 304, sample training data is received by the model. In some embodiments, the sample training data comprises one or more pieces of network activity data that includes anomalous activity that may be attributed to known sources. At block 306, the sample training data is processed by the model to attribute the anomalous activity to one or more actor profiles.

At block 308, the results produced by the model are compared with the expected results, and a determination is made at block 310 as to whether the model results are satisfactory. If the results are not satisfactory, then at block 312, the model may be updated based upon the comparison between the model results and the expected results. The process may then return to block 304, where the model receives additional sample training data (the same sample training data, or a different set of sample training data). In some embodiments, the weights afforded to certain features may be altered, based upon how indicative they are for attributing anomalous activity to an actor. For example, it may be found that IP address is not very useful for uniquely attributing anomalous activity to a particular actor (due to many actors being able to frequently change their IP address) but that file naming conventions may be more indicative when attributing anomalous activity to the actor. The weights afforded to each of these features may thus be adjusted accordingly.

In addition to training data, the model may continue to be updated during use. For example, an administrator or other user views the scores generated by the profiling model and selects a profile to attribute the anomalous activity, the model may be further updated and improved such that the generated scores will more closely reflect the attribution of anomalous activities to actor profiles. In some embodiments, the model may also be updated manually. For example, a user (e.g., user 215) may specify additional features that may be used to identify anomalous activity or attribute anomalous activity to a profile, change how a feature is used, and/or the like.

In some embodiments, as the profiling model is updated, detection of anomalous activity can be improved. For example, as actor profiles are built upon and associated with different anomalous activities, correlations between anomalous activity and certain types of commands or other network activity features may be identified. For example, it may be determined that a certain combination of commands occurring with a certain time proximity of each other may be strongly indicative of anomalous activity. As such, network activity data where it is unknown whether anomalous activity has occurred can be parsed in order to determine whether anomalous activity was present.

Anomalous Activity Identification and Profiling Process

Figure 4:
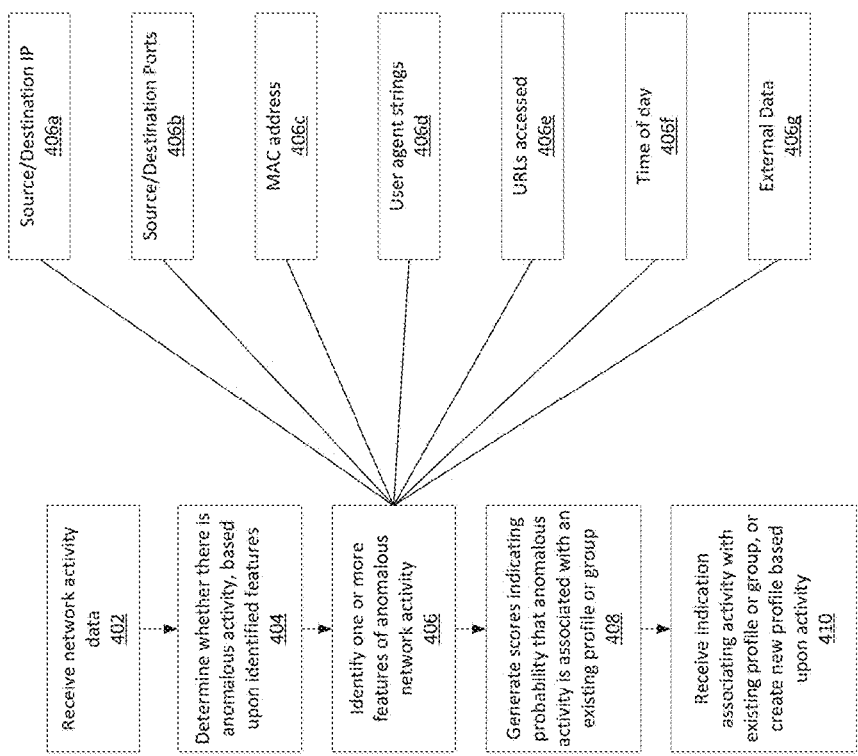
FIG. 4 illustrates a flowchart of a process for identifying and attributing anomalous network activity.

FIG. 4 illustrates a flowchart of a process for identifying and attributing anomalous network activity. At block 402, network activity data is received. In some embodiments, network activity data may be received from one or more different monitored networks, and may comprise any type of freely available network data (e.g., source/destination IP addresses, source/destination ports, MAC addresses, user agent strings, URLs, and/or the like). In addition, the network activity data may comprise additional types of data that may not be freely available, such as commands typed, files created or accessed, and/or the like. In some embodiments, the network activity data may contain additional data such as time stamps. In some embodiments, the network activity data is stored in a network activity log and is divided into one or more sessions.

At block 404, the received network activity data is analyzed to determine whether there is anomalous activity present. In some embodiments, a model utilizing machine learning may be used. In some embodiments, the model may extract one or more features from the received network activity information in order to identify possible anomalous activity.

Figure 5:
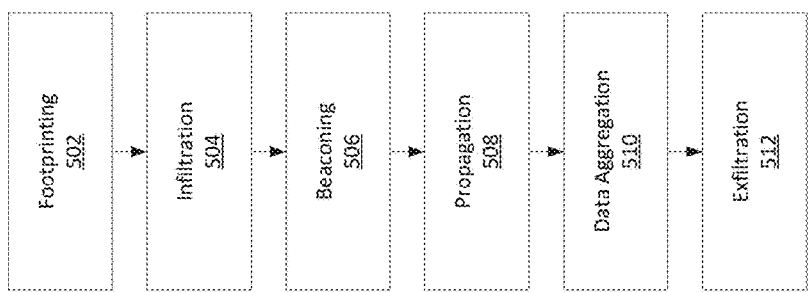
FIG. 5 illustrates some example phases of actor behavior when an actor is performing anomalous activity on a network.

In some embodiments, identifying anomalous activity in the network activity may comprise identifying a type of anomalous activity being performed. For example, in some embodiments, an actor accessing a network may do so over a number of different phases. FIG. 5 illustrates some of the phases that may be used by an actor when performing anomalous activity on a network. For example, in some embodiments, a hacker may first surveil a network during a "footprinting" phase 502. During this phase, the actor may visit one or more URLs associated with the network in order to identify possible points of entry into the network. Subsequently, the actor may perform an "infiltration" phase 504 where the actor accesses the network. In some embodiments, the actor may install a trojan or other tool within the network, allowing the actor to have continued access to the network.

In some embodiments, the actor, upon infiltrating a network, may not immediately perform any further activity. For example, the actor may wish maintain a foothold in the network for a period of time before performing further actions (e.g., in order to throw off suspicion, to perform further reconnaissance, and/or the like). In some embodiments, a trojan or other tool implanted by the actor within the network may ping an IP address associated with the actor at particular intervals, in order to verify that the actor still has access to the network. In some embodiments, this phase may be referred to as the "Beaconing" phase 506.

In some embodiments, after an actor has infiltrated a network, the actor may, during a "Propagation" phase 508, propagate their presence throughout the network. For example, the hacker may obtain administrator privileges for themselves in the network, create multiple footholds in different regions of the network, and/or the like. By doing so, the actor may solidify their foothold in the network, allowing the actor to continue to have a presence in the network even if individual footholds are removed.

In some embodiments, an actor may access a network for the purpose of obtaining data contained within the network (e.g., login info, credit card numbers, social security numbers, and/or the like). To do so, the actor may perform a "Data Aggregation" phase 510, where the desired data is located and gathered. For example, in some embodiments, data is gathered from different areas of the network and packaged into one or more files (e.g., a text file, a compressed ZIP file, and/or the like). The data may then be sent to an external source outside the network during an "Exfiltration" phase 512.

Each of these different phases may be associated with different types of activities or commands. In some embodiments, the anomaly detection model, when analyzing the received network activity data, may identify which phase the activity is associated with. For example, the presence of signal to a particular IP address at regular intervals may be indicative of "beaconing" being performed. Other types of activities may be more correlated with other phases, such as "data aggregation" or "exfiltration."

In some embodiments, being able to identify an anomalous activity phase may aid in the prediction of future anomalous activity. For example, if a "beaconing" phase activity has been identified on a network, then it may be inferred that "propagation", "data aggregation", or "exfiltration" activities may occur on the network in the near future, allowing a network administrator or other user to better prepare for the anomalous activity. In addition, if anomalous activity from a later phase (e.g., "exfiltration") is detected, previously recorded network activity data may be analyzed in order to detect anomalous activities associated with earlier phases (e.g., "infiltration").

At block 406, one or more features of the anomalous network activity are identified. The features of the anomalous activity can include a source or destination IP address associated with the activity 406*a*, a source or destination port associated with the activity 406*b*, a MAC address 406*c*, one or more user agent strings 406*d*, URLs accessed in connection with the activity 406*e*, time of day the activity occurred 406*f*, and/or the like.

In some embodiments, the features may also include external data 406*g*. For example, in some embodiments, when anomalous activity on a network is detected, a source IP address associated with the anomalous activity may be monitored. As such, information on other activities performed at the IP address may be collected (e.g., checking email, social networks, and/or the like) and used in identifying an actor.

At block 408, one or more scores are generated indicating a probability that the anomalous activity is associated with a particular actor profile, based at least in part upon the extracted features. In some embodiments, the scores are generated by a profiling model that compares the extracted features associated with the anomalous network activity to one or more features associated with an actor profile. Different features may be considered and weighed in different ways. For example, in some embodiments, it may be relatively easy for a particular actor to make use of different IP addresses. However, it is less likely that the actor will change certain behavioral characteristics such as which times of day they are active, what tools they prefer to use, and how they type commands and name files. Consequently, semantic analysis of the commands and filenames used may be a strong indicator for attributing anomalous activities to a particular actor.

In some embodiments, a "bag of words" may be used to analyze commands and filenames associated with an anomalous activity. An actor performing anomalous activity may perform commands and operations on one or more paths or folders. These paths and folder names may change depending on the network that the actor is targeting, but may contain common characteristics. For example, the actor may gather data from the network in a folder located at www.domain1.com/temp/bar when targeting a first network, and www.domain2.com/temp/bar when targeting a second network. Each of these paths may be broken up into a "bag of words" in order to analyze the component parts of the paths, allowing for different paths with similar parts to be attributed to the same actor.

In some embodiments, the model is configured to generate one or more scores corresponding to one or more existing profiles, wherein each score indicates a probability that the anomalous activity should be attributed to its corresponding profile. In some embodiments, the scores and corresponding profiles may be displayed to a user at a user interface.

At block 410, an indication is received associating the anomalous activity with a particular profile. In some embodiments, the indication may be received automatically. For example, the anomalous activity may be automatically associated with a particular actor profile based upon the one or more generated scores (e.g., if a particular score is the highest score and exceeds a threshold value). In some embodiments, the indication may be received in response to presenting to a user (e.g., an administrator or other authorized user) at a user interface at least a portion of the one or more scores (e.g., top 5 profiles with the highest scores), and receiving an input from the user specifying that the anomalous activity should be associated with a particular actor profile.

In some embodiments, if it is determined that the anomalous activity is not to be associated with an existing actor profile, a new profile may be created (e.g., a new profile may be automatically created in response to none of the generated scores meeting a threshold value, or in response to a user input specifying that the anomalous activity is not to be associated with any of the existing actor profiles). The anomalous activity is then attributed to the new profile.

As various anomalous activities are associated with an actor profile, a larger and more complete picture is built of the actor, providing insights into their behavioral preferences, preferred periods of activity, networks targeted, etc. This may make it easier to identify other anomalous activity associated with the actor, predict what activities the actor may perform in the future (e.g., which networks they will target, what their objectives are, etc.).

In some embodiments, the actor profile may be additionally enhanced using external data (e.g., data supplied by one or more users). For example, a user use his or her real-world knowledge to attribute a particular actor profile to a known individual, associate the actor profile with a group, associate the actor profile with one or more additional attributes, change one or more attribute values associated with the actor profile, and/or the like.

Profile Grouping

Hackers, cybercriminals, and other malicious actors often collaborate or work in concert, and may be associated with various groups or organizations. In some embodiments, one or more different actor profiles (e.g., corresponding to individual hackers or hacker groups) may be associated with a particular group (e.g., a hacker cell, organization, or country). By associating individual actor profiles with a group, a better picture can be obtained as what types of activities various groups are performing and what kinds of networks they are targeting, providing insights into the possible future activity of these groups.

For example, it may be found that a first set of anomalous activities can be attributed to a first actor, and that the first actor uses similar tools and names files in a similar matter as a second actor to whom a second set of anomalous activities are attributed. As such, it may be inferred that the first and second actors are working together or part of a group (e.g., a hacker cell). The group may then be analyzed as a whole, such as by determining what types of networks they are targeting (e.g., government networks, utility networks, and/or the like).

Figure 6:
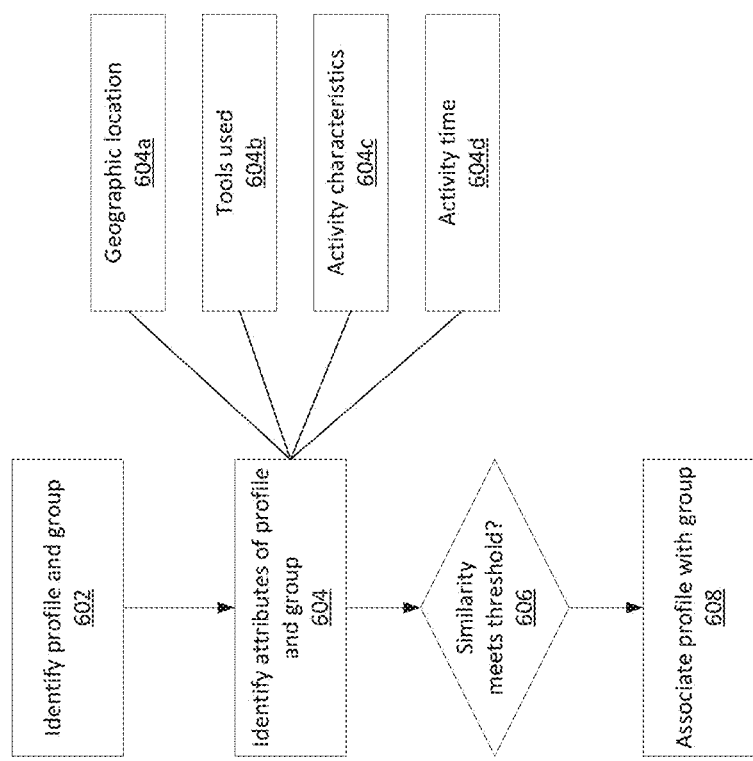
FIG. 6 illustrates a flowchart of a process for associating actor profiles with groups, in accordance with some embodiments.

FIG. 6 illustrates a flowchart of a process for associating actor profiles with groups, in accordance with some embodiments. At block 602, one or more profiles are identified. In some embodiments, the profile may be identified based upon one or more initial filter conditions (e.g., one or more attributes, such as geographic origin, and/or the like).

At block 604, attributes of the identified profile are identified. The attributes may include geographic location of the profile 604a, tools typically used by the profile 604b, activity characteristics associated with the profile 604c, typical time of activity of the profile 604d, and/or the like.

For example, in some embodiments, a profile may be associated with a geographic location (e.g., a country of origin). In some embodiments, the geographic location associated with the profile may be determined based upon an IP address associated with the profile. In some embodiments, the geographic location associated with the profile may be determined based upon one or more other attributes. For example, it may be known that certain tools are more commonly used by hackers from certain countries. If a particular profile has been known to use a tool typically utilized by hackers originating from China, then it may be inferred that the profile should be associated with China.

In some embodiments, a profile may be associated with one or more tools. A particular hacker may use a particular set of tools for performing certain tasks. For example, a first hacker may prefer to use a first tool to perform a beaconing task, while a second hacker may prefer to use a second, different tool to perform beaconing.

In some embodiments, a profile may be associated with one or more activity characteristics. For example, a particular hacker may tend to perform certain network activities in a certain order. In some embodiments, a particular hacker may exhibit certain preferences in how they type commands, name files, etc.

In some embodiments, a profile may be associated with an activity time range. For example, different hackers may be more active during certain times of the day. In some embodiments, the time of day that a particular hacker is most active may be used to determine a geographic location associated with the hacker. For example, if it is inferred that the hacker is most active during daylight hours, a geographic location associated with the profile may be inferred based upon timezone.

Similarly, a group profile may be associated with a plurality of different attributes. For example, a group may be associated with a geographic location where members of the group are believed to operate from or have ties to, tools commonly used by members of the group, activity characteristics frequently displayed by members of the group (e.g., file naming conventions, commands and techniques used, and/or the like), and typical times of activity of members of the group.

At block 606, the attributes of the profile are compared to those of the group, and a determination is made as to whether the similarity between the profile and group meets a threshold. In some embodiments, the similarity may be calculated as a score indicating a probability that the profile is associated with the group.

In some embodiments, how a similarity between a profile and group is determined may be different for different groups. For example, certain groups may be more strongly associated with certain geographic locations (e.g., associated with a particular country), while others may be more spread out between different locations. Certain groups may exhibit more standardized activity characteristics. As such, different attributes may have different weights for the purposes of determining a similarity between a profile and a group. For example, an actor profile may be required to be associated with a certain country in order to be associated with a group having strong ties to that country.

At block 608, if the determined similarity of the profiles is determined to satisfy the criteria, then the actor profiles may be associated with the group. In some embodiments, instead of automatically associating the actor profile with the group, information associated with the actor profile and group (e.g., common attributes between the actor and group) may be displayed to a user at a user interface, such that the user may make a selection as to whether to associate the actor and group or not. In some embodiments, the user may be presented with a plurality of similarity scores between the profile and a plurality of groups, allowing the user to select a group that the profile should be associated with.

In some embodiments, as more actors are associated with a group, the overall attributes of the group may change. In addition, as the users associated with a group change, the attributes of the group may change to reflect the users. For example, the actors of a particular group may be known to frequently use a first tool for performing a first task on a network. At a later time, it may be found that these actors have transitioned to using a second different tool for performing the first task. As such, the attributes of the group may be updated to reflect the change. In some embodiments, a user may specify or modify one or more attributes associated with the group. For example, a user may specify a name or codename to be associated with the group.

In some embodiments, a group may be associated with one or more other groups. For example, multiple groups each corresponding with a particular hacker cell may be associated with a group associated with a larger umbrella organization. In some embodiments, a group may be associated with another group based upon a comparison of one or more attributes of the groups. The process may be similar to the process for associating a profile with a group as described above.

Using Profile to Analyze Activity Trends

In some embodiments, actor profiles and group profiles may be used to analyze how different users and groups behave over time. For example, by attributing anomalous activity to actor profiles and associating actor profiles with group profiles, a history can formed for each profile. In some embodiments, a user interface may be generated allowing a user to view the profile of a particular actor or group, along with their associated attributes.

In addition, profile attributes may be used to filter actor and group profiles, in order to analyze specific attributes associated with certain types of actors and groups, and identify trends in their behavior.

Figure 7:
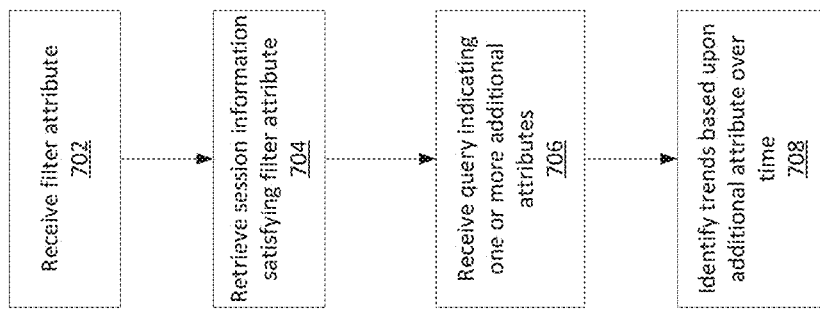
FIG. 7 illustrates a flowchart of a process for filtering and querying actor and group profiles, in accordance with some embodiments.

FIG. 7 illustrates a flowchart of a process for filtering and querying actor and group profiles, in accordance with some embodiments. At block 702, a filter attribute is received. The filter attribute may correspond to a value of an attribute associated with one or more actors or groups. For example, the filter attribute may correspond to a particular country, if it is desired to analyze actors and groups associated with that country. In another embodiment, the filter attribute may correspond to a set of tools or commands that may be used by an actor (e.g., it is desired to analyze actors or group that use a particular tool for a particular anomalous activity phase). In some embodiments, the filter attribute is received via a user interface presented to an administrator or other user. In some embodiments, the filter attribute may comprise the selection of a particular actor or group.

At block 704, data associated with actor and group profiles satisfying the filter attribute is retrieved. For example, the data may comprise network activity logs containing anomalous activity attributed to the actor and group profiles.

At block 706, one or more queries are received, the queries being associated with one or more attributes associated with the retrieved data. For example, an administrator or user may desire to know what types of tools and exploits actors and groups satisfying the filter attribute are using, what types of networks they are targeting over a particular period of time, and/or the like. In some embodiments, the query may contain a time constraint, limiting the anomalous activities to be analyzed.

At block 708, the one or more queries are processed to retrieve values of the queries based upon the anomalous activities associated with the identified profiles. In some embodiments, the retrieved attribute values may be correlated with time to produce a time series.

In some embodiments, user interface data may be generated based upon the results in order to display a user interface indicating values associated with the queried attribute have changed over time for the identified profiles. For example, the user interface may display a timeline or chart, allowing an administrator or other user to analyze the retrieved data and identify trends. For example, the administrator may provide an initial filter for actors and groups originating from Country A, and a query for the networks targeted by these actors and groups over the previous 5 years. Upon reviewing the returned data, trends in targeting can be identified and analyzed (e.g., it may be determined that the actors targeted primarily networks of a certain type during one year, but switched to targeting networks of another type in a subsequent year). In some embodiments, an individual actor or group may be selected, allowing a user to view data associated with the selected actor or group (e.g., values associated with the queried attribute for the selected actor or group over time).

In some embodiments, a user may view a change in an attribute (e.g., networks targeted), and correlate the change with one or more real life events that occurred during the same period (e.g., a change in international relations, an announcement of a new project, and/or the like).

Other Considerations

The disclosure also discusses logged activity. Where the context allows, logged activity can include all logged activity or logged activity for a selected period of time, such as the past 30 days. For example, when analyzing a new user activity against logged activity of the user, the logged activity of the user can be recent activity within the past year, excluding the new user activity.

The disclosure also discusses new user activity on a network. Where the context allows, this includes newly attempted user activity, newly performed user activity, and new activity being performed.

According to one embodiment, the techniques described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, Blackberry OS, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface (GUI), among other things.

Computer System

Figure 8:
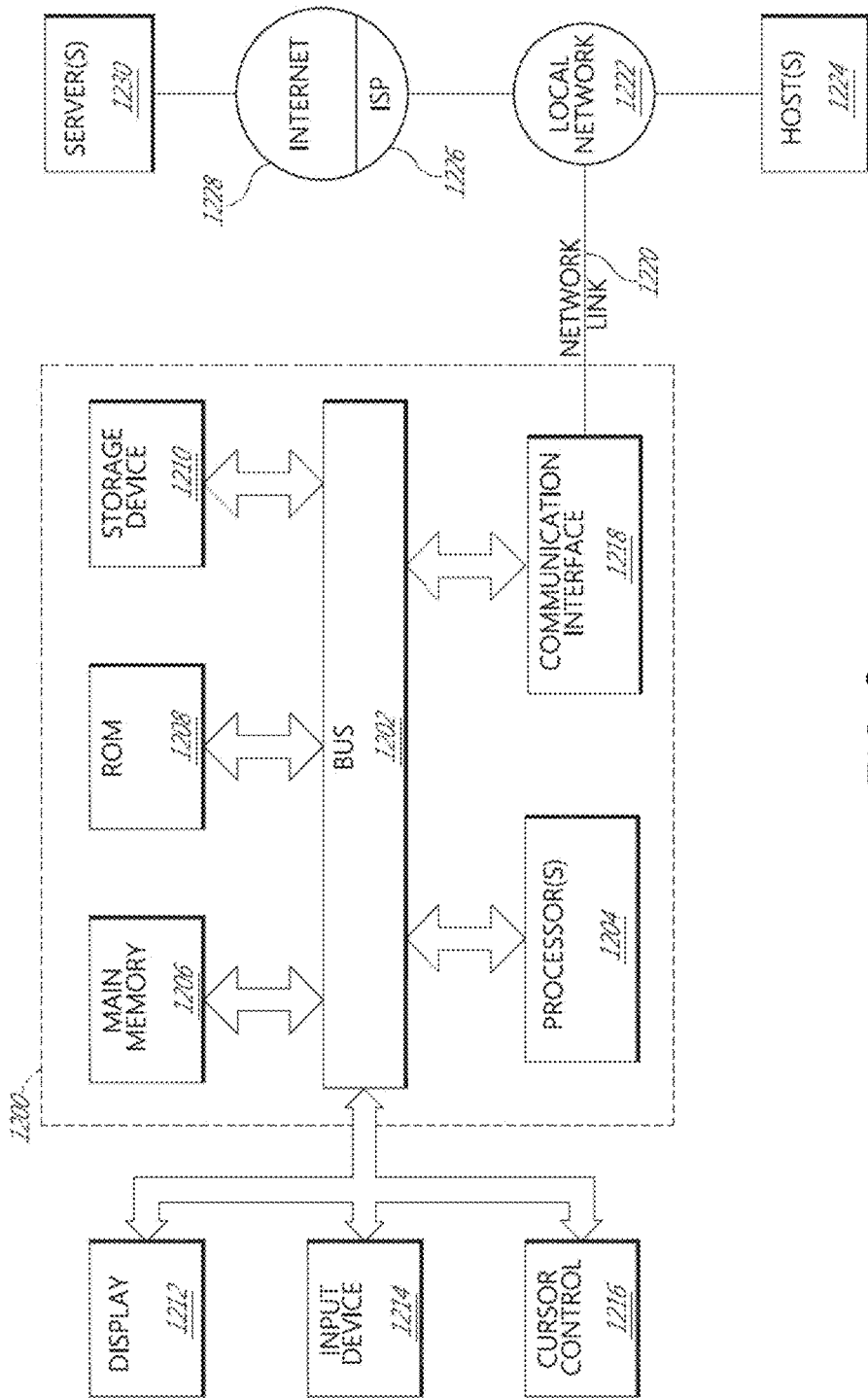
FIG. 8 is a block diagram that illustrates a computer system upon which an embodiment can be implemented.

For example, FIG. 8 is a block diagram that illustrates a computer system 1200 upon which an embodiment can be implemented. For example, any of the computing devices discussed herein, such user device 103, administrator computer 115, the anomaly detection system, analysis engine 111, and/or the warning generator 113 can include some or all of the components and/or functionality of the computer system 1200.

Computer system 1200 includes a bus 1202 or other communication mechanism for communicating information, and a hardware processor, or multiple processors, 1204 coupled with bus 1202 for processing information. Hardware processor(s) 1204 can be, for example, one or more general purpose microprocessors.

Computer system 1200 also includes a main memory 1206, such as a random access memory (RAM), cache and/or other dynamic storage devices, coupled to bus 1202 for storing information and instructions to be executed by processor 1204. Main memory 1206 also can be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), and so forth, is provided and coupled to bus 1202 for storing information and instructions.

Computer system 1200 can be coupled via bus 1202 to a display 1212, such as a cathode ray tube (CRT) or LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1214. This input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 1200 can include a user interface module to implement a GUI that can be stored in a mass storage device as executable software codes that are executed by the computing device(s). This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage Computer system 1200 can implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions included in main memory 1206. Such instructions can be read into main memory 1206 from another storage medium, such as storage device 1210. Execution of the sequences of instructions included in main memory 1206 causes processor(s) 1204 to perform the process steps described herein. In alternative embodiments, hard-wired circuitry can be used in place of or in combination with software instructions.

The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but can be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media can be involved in carrying one or more sequences of one or more instructions to processor 1204 for execution. For example, the instructions can initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 can retrieve and execute the instructions. The instructions received by main memory 1206 can optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 can be an integrated services digital network (ISDN) card, cable modem, satellite modem, or a modem to provide a data communication connection to a corresponding type of telephone line. As another example, communication interface 1218 can be a local area network (LAN) card to provide a data communication connection to a compatible LAN (or WAN component to communicate with a WAN). Wireless links can also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 can provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code can be executed by processor 1204 as it is received, and/or stored in storage device 1210, or other non-volatile storage for later execution.

To provide a framework for the above discussion of the specific systems and methods described herein, an example system will now be described. This description is provided for the purpose of providing an example and is not intended to limit the disclosure.

Each of the processes, methods, and algorithms described in the preceding sections can be embodied in, and fully or partially automated by, code modules executed by one or more computer systems or computer processors comprising computer hardware. The processes and algorithms can be implemented partially or wholly in application-specific circuitry.

Additional Discussion

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to or removed from the disclosed example embodiments. The example systems and components described herein can be configured differently than described. For example, elements can be added to, removed from, or rearranged compared to the disclosed example embodiments.

Conditional language, such as, among others, "can," "could," "might," or "can," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions can be deleted, executed out of order from that shown or discussed, including substantially concurrently or in reverse order, depending on the functionality involved, as would be understood by those skilled in the art. Furthermore, the embodiments illustratively disclosed herein may be suitably practiced in the absence of any element or aspect which is not specifically disclosed herein.

It should be emphasized that many variations and modifications can be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system for anomaly detection and profiling, the computer system comprising:
    one or more computer readable storage devices configured to store one or more software modules including computer executable instructions; and
    one or more computer processors in communication with the one or more computer readable storage devices and configured to execute the one or more software modules to cause the computer system to:
        receive one or more logs indicating network activity by an actor;
        determine that the logged network activity is anomalous;
        in response to the determination that the logged network activity is anomalous:

identify one or more features of the logged network activity that was determined to be anomalous;

access a data store containing a plurality of profiles, each profile of the plurality of profiles corresponding to a respective person or group to which anomalous network activity has been attributed;

determine, based at least in part on the identified one or more features, respective scores for each respective profile of the plurality of profiles, the respective scores indicating likelihoods that the logged network activity is attributable to each respective profile of the plurality of profiles;

select, based on the respective scores, a subset of the plurality of profiles for presentation; and transmit data to present, to a user, the subset of the plurality of profiles; and receive, from the user, an input indicating that the logged network activity is attributable to at least one of: a particular profile of the subset of the plurality of profiles, or a new profile.

2. The computer system of claim 1, wherein the identified one or more features includes a time of activity.

3. The computer system of claim 1, wherein the identified one or more features includes one or more commands used to perform the logged network activity.

4. The computer system of claim 1, wherein the identified one or more features includes one or more filenames associated with the logged network activity.

5. The computer system of claim 1, wherein the respective scores are determined using a model trained to compare the identified one or more features to features of each respective profile of the plurality of profiles.

6. The computer system of claim 1, wherein the respective scores are determined based at least in part upon the identified one or more features and one or more features associated with each respective profile.

7. The computer system of claim 1, wherein the one or more computer processors are further configured to cause the computer system to:

determine that the logged network activity that was determined to be anomalous is attributable to the particular profile or the new profile.

8. The computer system of claim 1, wherein at least some profiles of the plurality of profiles are associated with a group profile.

9. The computer system of claim 8, wherein the one or more computer processors are further configured to determine whether a profile is associated with the group profile by:

identifying one or more attributes associated with the profile;

comparing the one or more attributes associated with the profile to one or more attributes associated with the group profile to generate a similarity score; and associating the profile with the group profile in response, based at least in part upon the similarity score.

10. The computer system of claim 9, wherein the one or more attributes associated with the group profile are determined based upon a second plurality of profiles associated with the group profile.

11. The computer system of claim 1, wherein the one or more computer processors are further configured to cause the computer system to:

use a trained model to analyze the identified one or more features to select the subset of the plurality of profiles; and update the trained model based on the input received from the user.

12. A computer-implemented method for anomaly detection and profiling, comprising:

receiving one or more logs indicating network activity by an actor;

determining that the logged network activity is anomalous;

in response to the determination that the logged network activity is anomalous:

identifying one or more features of the logged network activity that was determined to be anomalous;

accessing a data store containing a plurality of profiles, each profile of the plurality of profiles corresponding to a respective person or group to which anomalous network activity has been attributed;

determining, based at least in part on the identified one or more features, respective scores for each respective profile of the plurality of profiles, the respective scores indicating likelihoods that the logged network activity that was determined to be anomalous is attributable to each respective profile of the plurality of profiles;

selecting, based on the respective scores, a subset of the plurality of profiles for presentation; and transmitting data to present, to a user, the subset of the plurality of profiles; and receiving, from the user, an input indicating that the logged network activity is attributable to at least one of: a particular profile of the subset of the plurality of profiles, or a new profile.

13. The computer-implemented method of claim 12, wherein the identified one or more features includes a time of activity.

14. The computer-implemented method of claim 12, wherein the identified one or more features includes one or more commands used to perform the logged network activity.

15. The computer-implemented method of claim 12, wherein the identified one or more features includes one or more filenames associated with the logged network activity.

16. The computer-implemented method of claim 12, wherein determining the scores comprises using a model trained to compare the identified one or more features to features of each respective profile of the plurality of profiles.

17. The computer-implemented method of claim 12, wherein the respective scores are determined based at least in part upon the identified one or more features and one or more features associated with each respective profile.

18. The computer-implemented method of claim 12, wherein at least some profiles of the plurality of profiles are associated with a group profile.

19. The computer-implemented method of claim 18, further comprising determining whether a profile is associated with the group profile by:

identifying one or more attributes associated with the profile;

comparing the one or more attributes associated with the profile to one or more attributes associated with the group profile to generate a similarity score; and associating the profile with the group profile in response, based at least in part upon the similarity score.

20. The computer-implemented method of claim 19, wherein the one or more attributes associated with the group profile are determined based upon a second plurality of profiles associated with the group profile.

* * * * *